(12) United States Patent
Choi et al.

(10) Patent No.: US 12,632,662 B2
(45) Date of Patent: May 19, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Hyungtak Choi, Suwon-si (KR); Munjo Kim, Suwon-si (KR); Seonghan Ryu, Suwon-si (KR); Sejin Kwak, Suwon-si (KR); Lohith Ravuru, Suwon-si (KR); Haehun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 17/947,758

(22) Filed: Sep. 19, 2022

(65) Prior Publication Data

US 2023/0020143 A1    Jan. 19, 2023

Related U.S. Application Data

(63) Continuation of application No. PCT/KR2022/010639, filed on Jul. 20, 2022.

(30) Foreign Application Priority Data

Oct. 18, 2021    (KR) ........................ 10-2021-0138349

(51) Int. Cl.
G06F 40/30 (2020.01)
G06F 40/42 (2020.01)
G06V 40/16 (2022.01)

(52) U.S. Cl.
CPC .............. G06F 40/30 (2020.01); G06F 40/42 (2020.01); G06V 40/16 (2022.01)

(58) Field of Classification Search
CPC .......... G06F 40/30; G06F 40/42; G06V 40/16
See application file for complete search history.

(56) References Cited

U.S. PATENT DOCUMENTS

| | | | |
|---|---|---|---|
| 9,740,677 | B2 | 8/2017 | Kim et al. |
| 10,986,046 | B2 | 4/2021 | Kim |

(Continued)

FOREIGN PATENT DOCUMENTS

| | | |
|---|---|---|
| CN | 110209897 A | 9/2019 |
| KR | 10-2016-0010746 A | 1/2016 |

(Continued)

OTHER PUBLICATIONS

Communication dated Oct. 28, 2022, issued by the International Searching Authority in counterpart International Application No. PCT/KR2022/010639 (PCT/ISA/210).
Communication dated Oct. 28, 2022, issued by the International Searching Authority in counterpart International Application No. PCT/KR2022/010639 (PCT/ISA/237).
Communication dated Sep. 12, 2024, issued by the European Patent Office for European Patent Application No. 22883725.8.

*Primary Examiner* — Bhavesh M Mehta
*Assistant Examiner* — Edward Tracy, Jr.
(74) *Attorney, Agent, or Firm* — Sughrue Mion, PLLC

(57) ABSTRACT

The disclosure refers to electronic apparatuses and controlling methods thereof. In an embodiment, an electronic apparatus includes an input interface, an output interface, and a processor that is communicatively coupled to the input interface and the output interface. The processor is configured to control the input interface to receive conversation data including one or more texts and one or more images. The processor is further configured to extract a first text and an image from the conversation data. The processor is further configured to identify a meaning of the conversation data based on at least one of the first text and the image. The processor is further configured to control the output interface to output the meaning of the conversation data.

13 Claims, 7 Drawing Sheets

<u>100</u>

(56)                    References Cited

U.S. PATENT DOCUMENTS

| | | |
|---|---|---|
| 2014/0067397 A1 | 3/2014 | Radebaugh |
| 2014/0163957 A1* | 6/2014 | Tesch ..................... G06F 40/30 |
| | | 704/9 |
| 2014/0245115 A1* | 8/2014 | Zhang .................. G06F 40/103 |
| | | 715/202 |
| 2016/0210962 A1 | 7/2016 | Kim et al. |
| 2019/0012376 A1* | 1/2019 | Fujimoto ............. G06F 16/335 |
| 2019/0197102 A1 | 6/2019 | Lerner et al. |
| 2019/0386937 A1 | 12/2019 | Kim |
| 2020/0026766 A1* | 1/2020 | Ji ......................... G06V 30/153 |
| 2020/0036831 A1* | 1/2020 | Kim ................... H04M 1/7243 |
| 2021/0103610 A1* | 4/2021 | Lee ...................... G06F 16/444 |
| 2022/0182343 A1* | 6/2022 | Lee ........................ G10L 15/22 |
| 2024/0106769 A1* | 3/2024 | Lee ........................ H04L 51/04 |

FOREIGN PATENT DOCUMENTS

| | | |
|---|---|---|
| KR | 10-2017-0061647 A | 6/2017 |
| KR | 10-1964514 B1 | 4/2019 |
| KR | 10-2019-0096304 A | 8/2019 |
| KR | 10-2019-0123093 A | 10/2019 |
| KR | 10-2020-0025177 A | 3/2020 |
| KR | 10-2020-0048716 A | 5/2020 |
| KR | 10-2021-0039610 A | 4/2021 |
| KR | 10-2021-0039618 A | 4/2021 |

* cited by examiner

<u>100</u>

100

300

400

ELECTRONIC APPARATUS AND CONTROLLING METHOD THEREOF

CROSS-REFERENCE TO RELATED APPLICATIONS

This application is a continuation application of International Application No. PCT/KR2022/010639 filed on Jul. 20, 2022, which claims priority to Korean Patent Application 10-2021-0138349, filed on Oct. 18, 2021, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus that identifies the meaning of a conversation content, and a controlling method thereof.

2. Description of the Related Art

Following the development of electronic and communication technologies, social network service (SNS) is being used frequently. Previously, there were many cases wherein users had conversations with texts, but recently, users have lots of conversations using images.

A user can obtain meaningful information from images and understand the context of a conversation, but it is difficult for an electronic apparatus to infer meaningful information or the context of a conversation from a conversation including images.

Accordingly, there is a need for a technology of obtaining meaningful information and inferring the context of a conversation from a conversation including images.

SUMMARY

Provided are an electronic apparatus that infers important information or the context from a conversation content including images, and a controlling method thereof.

According to an aspect of the disclosure, an electronic apparatus includes an input interface, an output interface, and a processor that is communicatively coupled to the input interface and the output interface. The processor is configured to control the input interface to receive conversation data including one or more texts and one or more images. The processor is further configured to extract a first text and an image from the conversation data. The processor is further configured to identify a meaning of the conversation data based on at least one of the first text and the image. The processor is further configured to control the output interface to output the meaning of the conversation data.

In some embodiments, the processor of the electronic apparatus is further configured to identify the meaning of the conversation data based on the first text and the image.

In other optional or additional embodiments, the processor of the electronic apparatus is further configured to identify the meaning of the conversation data based on the first text excluding the image.

In other optional or additional embodiments, the processor of the electronic apparatus is further configured to, based on the meaning of the conversation data not being identified based on the first text excluding the image, extract coordinates for an area of the image and replace the area of the image with a predetermined second text based on the coordinates, and identify the meaning of the conversation data based on the first text and the predetermined second text.

In other optional or additional embodiments, the predetermined second text includes at least one of a positive response text, a negative response text, and a text related to the first text.

In other optional or additional embodiments, the processor of the electronic apparatus is further configured to, based on the meaning of the conversation data not being identified based on the predetermined second text, recognize a third text included in the image by using an optical character recognition (OCR) method, and identify the meaning of the conversation data based on the first text and the third text.

In other optional or additional embodiments, the processor of the electronic apparatus is further configured to, based on the first text being a first language and the third text being a second language different from the first language, translate the third text into the first language.

In other optional or additional embodiments, the processor of the electronic apparatus is further configured to, based on the third text not being included in the image or the meaning of the conversation data not being identified based on the third text, extract caption information from the image, and identify the meaning of the conversation data based on the first text and the caption information.

In other optional or additional embodiments, the processor of the electronic apparatus is further configured to, based on the meaning of the conversation data not being identified based on the caption information, recognize a facial expression included in the image, identify an emotion corresponding to the facial expression, and identify the meaning of the conversation data based on the first text and the emotion.

In other optional or additional embodiments, the processor of the electronic apparatus is further configured to, based on an uniform record locator (URL) being included in the image, identify the URL and connect to the URL.

In other optional or additional embodiments, the processor of the electronic apparatus is further configured to control the output interface to output a screen connected to the URL.

In other optional or additional embodiments, the processor of the electronic apparatus is further configured to control the output interface to output the meaning of the conversation data as an output image.

In other optional or additional embodiments, the image includes at least one of an emoticon, a thumbnail image, and a meme.

According to another aspect of the disclosure, a controlling method of an electronic apparatus includes receiving conversation data including one or more texts and one or more images. The controlling method further includes extracting a first text and an image from the conversation data. The controlling method further includes identifying a meaning of the conversation data based on at least one of the first text and the image. The controlling method further includes outputting the meaning of the conversation data.

In some embodiments, the identifying, by the controlling method, of the meaning of the conversation data includes identifying the meaning of the conversation data based on the first text and the image.

In other optional or additional embodiments, the identifying, by the controlling method, of the meaning of the conversation data includes identifying the meaning of the conversation data based on the first text excluding the image.

In other optional or additional embodiments, the identifying, by the controlling method, of the meaning of the conversation data includes, based on the meaning of the conversation data not being identified based on the first text excluding the image, extracting coordinates for an area of the image and replacing the area of the image with a predetermined second text based on the coordinates, and identifying the meaning of the conversation data based on the first text and the predetermined second text.

In other optional or additional embodiments, the identifying, by the controlling method, of the meaning of the conversation data includes, based on the meaning of the conversation data not being identified based on the predetermined second text, recognizing a third text included in the image by using an OCR method, and identifying the meaning of the conversation data based on the first text and the third text.

Additional aspects will be set forth in part in the description which follows and, in part, will be apparent from the description, or may be learned by practice of the presented embodiments.

Advantageous effects obtainable from the disclosure are not limited to the above-mentioned advantageous effects, and other advantageous effects not mentioned herein will be clearly understood by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
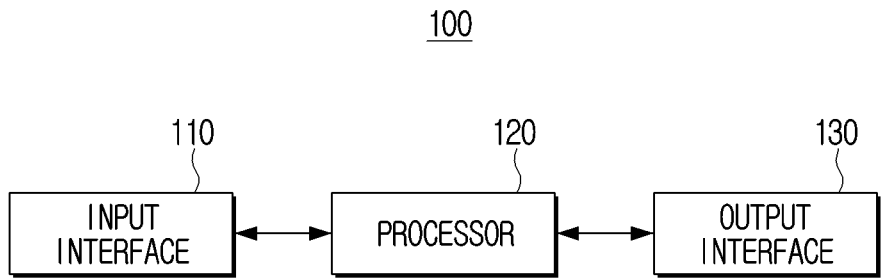
FIG. 1 is a block diagram illustrating a configuration of an electronic apparatus according to an embodiment of the disclosure.

Hereinafter, various embodiments will be described in more detail with reference to the accompanying drawings. The embodiments described in this specification may be modified in various ways. Also, specific embodiments may be illustrated in the drawings, and described in detail in the detailed description. However, specific embodiments disclosed in the accompanying drawings are just for making the various embodiments easily understood. Accordingly, the technical idea of the disclosure is not restricted by the specific embodiments disclosed in the accompanying drawings, and the embodiments should be understood as including all equivalents or alternatives included in the idea and the technical scope of the disclosure.

Also, terms including ordinal numbers such as 'the first' and 'the second' may be used to describe various components, but these components are not limited by the aforementioned terms. The aforementioned terms are used only for the purpose of distinguishing one component from another component.

In addition, in this specification, terms such as "include" and "have" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof. Further, the description in the disclosure that an element is "coupled with/to" or "connected to" another element should be interpreted to mean that the one element may be directly coupled with/to or connected to the another element, but still another element may exist between the elements. In contrast, the description that one element is "directly coupled" or "directly connected" to another element can be interpreted to mean that still another element does not exist between the one element and the another element.

Meanwhile, "a module" or "a part" for the elements used in this specification performs at least one function or operation. Also, "a module" or "a part" may perform a function or an operation by hardware, software, or a combination of hardware and software. Also, a plurality of "modules" or a plurality of "parts" except "a module" or "a part" that needs to be implemented in specific hardware or is performed in at least one processor may be integrated into at least one module. Further, singular expressions include plural expressions, unless defined obviously differently in the context.

Also, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

Further, in this specification, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

In addition, in describing the disclosure, in case it is determined that detailed explanation of related known functions or features may unnecessarily confuse the gist of the disclosure, the detailed explanation will be abridged or omitted. Meanwhile, each embodiment of the disclosure may be independently implemented or operated, but it may also be implemented or operated in combination with another embodiment.

FIG. 1 is a block diagram illustrating a configuration of an electronic apparatus according to an embodiment of the disclosure.

Referring to FIG. 1, an electronic apparatus 100 includes an input interface 110, a processor 120, and an output interface 130.

The input interface 110 may receive input of conversation data including texts and images. For example, conversation data may be data that is transmitted and/or received for a conversation between users by using, for example, but not limited to, a short message service (SMS), and a social network service (SNS) app. Images included in the conversation data may include emoticons, thumbnail images, and memes, among others. However, images included in the conversation data are not limited to the aforementioned examples, and may include all images other than texts.

In some embodiments, the input interface 110 may include a communication interface, an input/output port, or the like. The input interface 110 may perform a function of being provided with conversation data from an external apparatus. Alternatively or additionally, the input interface 110 may be referred to, for example, as an inputter, an input device, an input module, or the like.

In case the input interface 110 is implemented as a communication interface, the input interface 110 may perform communications with an external apparatus. For example, the input interface 110 may transmit conversation data, which may have been input by the user of the electronic apparatus 100, to an external apparatus by using a wired/wireless communication method. Alternatively or additionally, the input interface 110 may receive conversation data, which may have been input by the user of the external apparatus, from the external apparatus by using a wired/wireless communication method. In some embodiments a wired/wireless communication method used for transmitting the conversation data may differ from another wired/wireless communication method used for receiving the conversation data. As an example, conversation data may be provided to the electronic apparatus 100 through a web server, a cloud, and the like. For example, the communication interface may include a module that can perform communication by methods such as, but not limited to, third generation cellular (3G), Long Term Evolution (LTE), fifth generation mobile network (5G), Wireless-Fidelity (Wi-Fi), Bluetooth, Digital Multimedia Broadcasting (DMB), Digital Video Broadcasting (DVB), and Local Area Network (LAN). The communication interface performing communication with the external apparatus may also be referred to, for example, as a communicator, a communication device, a communication module, a transceiver, and the like.

In case the input interface 110 is implemented as an input/output port, the input interface 110 may be provided with conversation data from an external apparatus (including an external memory). As an example, the input interface 110 may be provided with conversation data from communications performed among a plurality of users. For example, in case the input interface 110 is implemented as an input/output port, the input/output port may include ports such as, but not limited to, a high-definition multimedia interface (HDMI), a universal serial bus (USB), a Thunderbolt, and a LAN.

Alternatively or additionally, the input interface 110 may receive input of a control instruction from a user. For example, the input interface 110 may include at least one user input device, such as, but not limited to, a key pad, a touch pad, and a touch screen.

The processor 120 may control each component of the electronic apparatus 100. For example, the processor 120 may control the input interface 110 to receive input of conversation data, and control the output interface 130 to output the identified meaning of the conversation data.

The processor 120 may extract a text (e.g., an original text) and an image from the conversation data. That is, the conversation data may include the extracted text and the extracted image. Then, the processor 120 may identify the meaning of the conversation data based on the extracted text and the extracted image. Identifying the meaning of the conversation data may comprise operations in which the electronic apparatus 100 extracts information related to the conversation from the image or replaces the image with information related to the conversation, and, thereby, may understand the context of the conversation data and/or may acquire information from the conversation data.

For example, the processor 120 may identify the conversation data only with the original text (e.g., excluding the image in the conversation data). If the meaning of the conversation data is not identified with only the original text, the processor 120 may extract coordinates for the image area. Then, the processor 120 may replace the image with a predetermined text in the image area based on the extracted coordinates, and identify the meaning of the conversation data based on the original text and the replaced text. As an example, the replaced text may be a positive text or a negative text related to the previous sentence. Alternatively or additionally, the replaced text may be related to the previous sentence or to the previous conversation context.

If the meaning of the conversation data is not identified based on the replaced text, the processor 120 may determine whether text is included in the image. For example, the processor 120 may scan the image by using an optical character recognition (OCR) method, and recognize the text included in the image. If the text included in the image is recognized, the processor 120 may determine that the text is included in the image. Then, the processor 120 may identify the meaning of the conversation data based on the original text and the recognized text. Alternatively or additionally, if the original text is a text of a first language, and the recognized text is a text of a second language different from the first language, the processor 120 may translate the recognized text into the first language.

If text is not included in the image or the meaning of the conversation data is not identified based on the recognized text, the processor 120 may extract caption information from the image. For example, the caption information may be text explaining (e.g., describing) the image. The processor 120 may identify the meaning of the conversation data based on the original text and the extracted caption information.

If the meaning of the conversation data is not identified based on the original text and the extracted caption information, the processor 120 may determine whether a face object is included in the image. If a face object is included in the image, the processor 120 may recognize a facial expression from the face object, and identify an emotion corresponding to the recognized facial expression. The processor 120 may identify the meaning of the conversation data based on the original text and the identified emotion.

In some embodiments, a uniform record locator (URL) may be included in the image. The processor 120 may identify an URL included in the image based on the OCR method and/or the extracted caption information. The processor 120 may connect to the identified URL. Alternatively or additionally, the processor 120 may connect to the identified URL and acquire main information from the identified URL. As an example, the identified URL may be an URL corresponding to a map, a home page, or the like, and the main information may include place information, shop name information, product information, or the like. The disclosure is not limited in this regard.

The output interface 130 may output the identified meaning of the conversation data. For example, the output interface 130 may be implemented as at least one of a communication interface, a speaker, or a display. The output interface 130 may perform a function of outputting the identified meaning of the conversation data, and/or additional data. In some embodiments, the output interface 130 may be referred to as, but not limited to, an outputter, an output device, and an output module.

In case the output interface 130 is implemented as a communication interface, the output interface 130 may perform communications with an external apparatus. For example, the output interface 130 may transmit data, which may include the meaning of the conversation data, to the external apparatus by using one or more wired/wireless communication methods.

In case the output interface 130 is implemented as a speaker, the output interface 130 may output the meaning of the conversation data identified as a voice signal. Alternatively or additionally, the output interface 130 may output an input instruction of a user, state-related information or operation-related information of the electronic apparatus 100 as a voice or a notification sound.

In case the output interface 130 is implemented as a display, the output interface 130 may output the meaning of the conversation data identified as an image signal. For example, the display may be implemented as, but not limited to, a liquid crystal display (LCD), organic light emitting diodes (OLED), a flexible display, a touch screen, and the like. In case the display is implemented as a touch screen, the electronic apparatus 100 may receive input of a control instruction through the touch screen.

Figure 2:
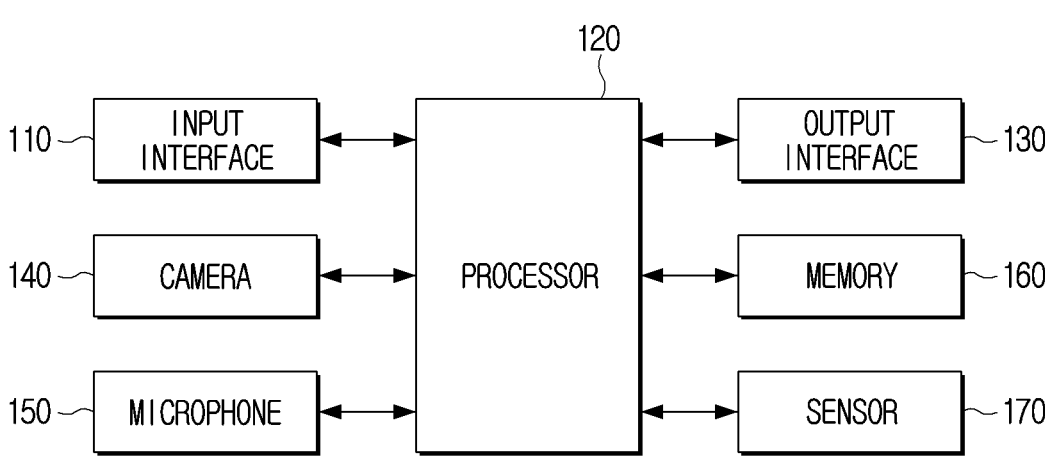
FIG. 2 is a block diagram illustrating a detailed configuration of an electronic apparatus according to an embodiment of the disclosure.

FIG. 2 is a block diagram illustrating a detailed configuration of an electronic apparatus according to an embodiment of the disclosure.

Referring to FIG. 2, the electronic apparatus 100 may include an input interface 110, a processor 120, an output interface 130, a camera 140, a microphone 150, a memory 160, and a sensor 170. The input interface 110, the processor 120, and the output interface 130 may be the same as or similar to the input interface 110, the processor 120, and the output interface 130 described above in reference to FIG. 1, and, as such, a detailed explanation may be omitted for brevity.

The camera 140 may photograph the surrounding environment of the electronic apparatus 100. Alternatively or additionally, the camera 140 may photograph a user's facial expression or operation, for example. The processor 120 may acquire information on the surrounding environment from the photographed image, and recognize a control instruction based on the photographed facial expression or operation of the user, and perform a control operation corresponding to the recognized control instruction. For example, the camera 140 may include a charge coupled device (CCD) sensor and/or a complementary metal oxide semiconductor (CMOS) sensor. In some embodiments, the camera 140 may include a Red/Green/Blue (RGB) camera and/or a depth camera.

The microphone 150 may receive input of an external sound signal. The processor 120 may process the input sound signal and perform a corresponding operation. For example, in case an external sound signal is a user's voice, the processor 120 may recognize a control instruction based on the input voice, and perform a control operation corresponding to the recognized control instruction.

The memory 160 may store data performing functions of the electronic apparatus 100. Alternatively or additionally, the memory 160 may store programs, instructions, and/or data operated in the electronic apparatus 100. In some embodiments, the memory 160 may be implemented using memory types such as, but not limited to, a read-only memory (ROM), a random-access memory (RAM), a hard-disk drive (HDD), a solid state drive (SSD), and a memory card.

The sensor 170 may sense an operation, a distance, a location, and the like, of a user. The processor 120 may recognize a control instruction based on the operation, the distance, and/or the location sensed by the sensor 170, and perform a control operation corresponding to the recognized control instruction. Alternatively or additionally, the sensor 170 may sense information on the surrounding environment of the electronic apparatus 100. The processor 120 may perform a corresponding control operation based on the information on the surrounding environment sensed at the sensor 170. For example, the sensor 170 may include, but not be limited to, an acceleration sensor, a gravity sensor, a gyro sensor, a geomagnetic sensor, a direction sensor, a motion recognition sensor, a proximity sensor, a voltmeter, an ampere meter (e g, ammeter), a barometer, a hygrometer, a thermometer, an illumination sensor, a heat detection sensor, a touch sensor, an infrared sensor, and an ultrasonic sensor.

So far, each component of the electronic apparatus 100 was described. Hereinafter, a process of identifying the meaning of conversation data from an image included in the conversation data will be described.

Figure 3:
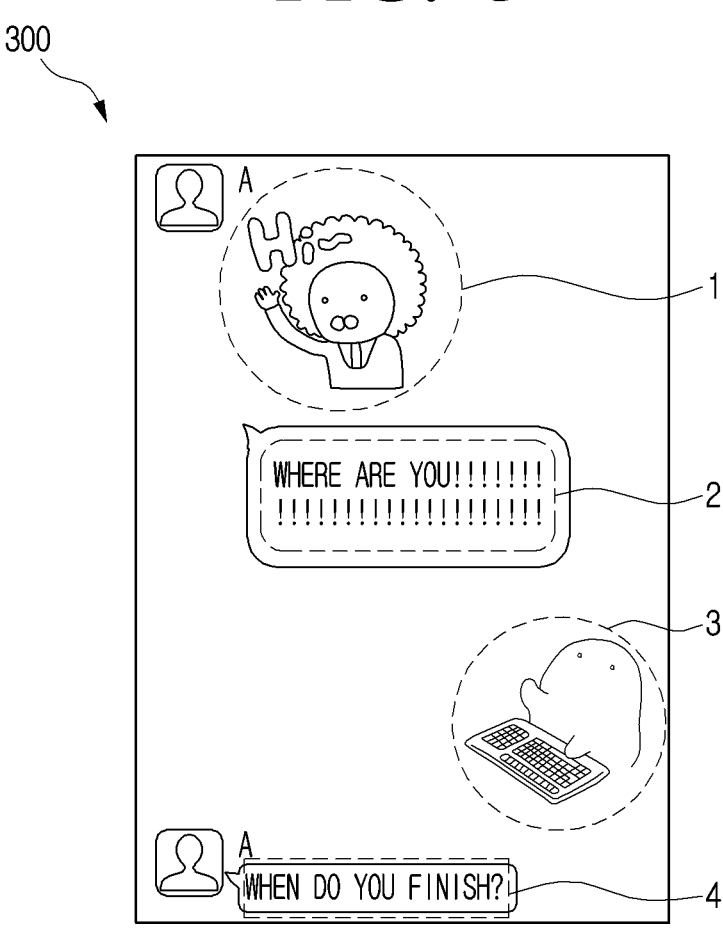
FIG. 3 is a diagram illustrating conversation data according to an embodiment of the disclosure.

FIG. 3 is a diagram illustrating conversation data according to an embodiment of the disclosure.

Referring to FIG. 3, conversation data 300 including texts and images is illustrated. In the conversation data 300 illustrated in FIG. 3, a first image object 1 may include text of a different language, a second image object 2 may include text, a third image object 3, and a text object 4 are included. For example, the images may include emotions, thumbnail images, memes, and the like.

As an example, the electronic apparatus 100 may recognize the text from the first image object 1, including the text of a different language, by using the OCR method. In case the recognized text is a language different from the main language of the conversation data 300, the electronic apparatus 100 may translate the text into the main language. For example, in the conversation data 300 illustrated in FIG. 3, Korean may be the main language. The electronic apparatus 100 may recognize an English text 'Hi' from the first image object 1. As 'Hi' is a language different from the main language of the conversation data 300, the electronic apparatus 100 may perform translation into Korean, and identify the meaning of the conversation data 300. The electronic apparatus 100 may identify the meaning of the conversation data 300 based on the recognized text together with the previous and subsequent conversation data.

Alternatively or additionally, the electronic apparatus 100 may recognize text from the second image object 2 by using the OCR method. For example, the electronic apparatus 100 may recognize a text 'Where are you' from the second image object 2. The electronic apparatus 100 may identify the meaning of the conversation data 300 based on the recognized text together with the previous and subsequent conversation data.

Alternatively or additionally, the electronic apparatus 100 may extract caption information from the third image object 3 by using an image caption engine. For example, the electronic apparatus 100 may extract caption information from the third image object 3 such as, but not limited to, "a character," "a keyboard," "a situation wherein a character is pressing the keyboard," and "a situation wherein a character is working". The electronic apparatus 100 may identify the meaning of the conversation data 300 based on the extracted caption information together with the previous and subsequent conversation data.

Alternatively or additionally, the electronic apparatus 100 may recognize text from the text object 4. For example, the electronic apparatus 100 may recognize the text 'When do you finish?' from the text object 4, and identify the meaning of the conversation data 300 based on the recognized text together with the previous and subsequent conversation data.

As an example, from the conversation data 300 illustrated in FIG. 3, the electronic apparatus 100 may identify that the meaning of the conversation data 300 is a conversation wherein A says hi and asks B where he is, and B answers that he is working, and A asks again when the work ends.

Figure 4:
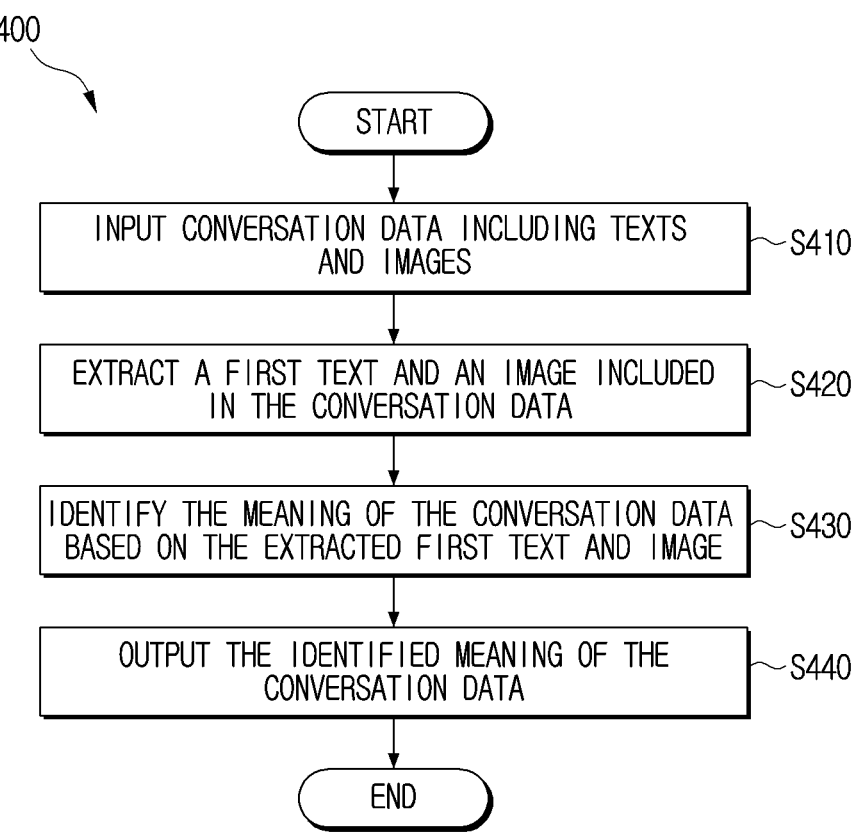
FIG. 4 is a flow chart illustrating a controlling method of an electronic apparatus according to an embodiment of the disclosure.

FIG. 4 is a flow chart illustrating a controlling method 400 of an electronic apparatus 100 according to an embodiment of the disclosure.

Referring to FIG. 4, an electronic apparatus 100 receives input of conversation data including texts and images in operation S410. For example, the images may include emoticons, thumbnail images, memes, and the like.

The electronic apparatus 100 extracts a text (e.g., a first text) and an image included in the conversation data in operation S420, and identifies the meaning of the conversation data based on the extracted text and image in operation S430. For example, the electronic apparatus 100 may identify the meaning of the conversation data based on the first text excluding the image. In case the meaning of the conversation data is not identified based on the first text excluding the image, the electronic apparatus 100 may extract coordinates for the area of the image. Then, the electronic apparatus 100 may replace the area of the image with a predetermined text (e.g., a second text) based on the extracted coordinates, and identify the meaning of the conversation data based on the first text and the second text. As an example, the predetermined second text may include at least one text among a text of a positive response, a text of a negative response, and a text related to the first text.

Alternatively or additionally, in case the meaning of the conversation data is not identified based on the predetermined second text, the electronic apparatus 100 may recognize a text (e.g., a third text) included in the image by using the OCR method. The electronic apparatus 100 may identify the meaning of the conversation data based on the first text and the recognized third text. In case the first text is in a first language and the recognized third text is in a second language different from the first language, the electronic apparatus 100 may translate the recognized third text into the first language, and then identify the meaning of the conversation data.

In some embodiments, in case the third text is not included in the image or the meaning of the conversation data is not identified based on the third text, the electronic apparatus 100 may extract caption information from the image. Then, the electronic apparatus 100 may identify the meaning of the conversation data based on the first text and the caption information. Alternatively or additionally, in case the meaning of the conversation data is not identified based on the extracted caption information, the electronic apparatus 100 may recognize a facial expression included in the image. The electronic apparatus 100 may identify an emotion corresponding to the recognized facial expression, and identify the meaning of the conversation data based on the first text and the identified emotion.

Alternatively or additionally, in case an URL is included in the image, the electronic apparatus 100 may identify the URL from the caption information extracted by using the OCR method or by using the image caption engine. The electronic apparatus 100 may connect to the identified URL. The electronic apparatus 100 may display a screen connected to the URL and/or acquire main information from the identified URL. As an example, the main information may include, but not limited to, place information, shop name information, product information, and the like.

The electronic apparatus 100 outputs the identified meaning of the conversation data in operation S440. In case an URL is included in the image, the electronic apparatus 100 may output the screen connected to the URL and/or the main information acquired from the identified URL.

Figure 5A:
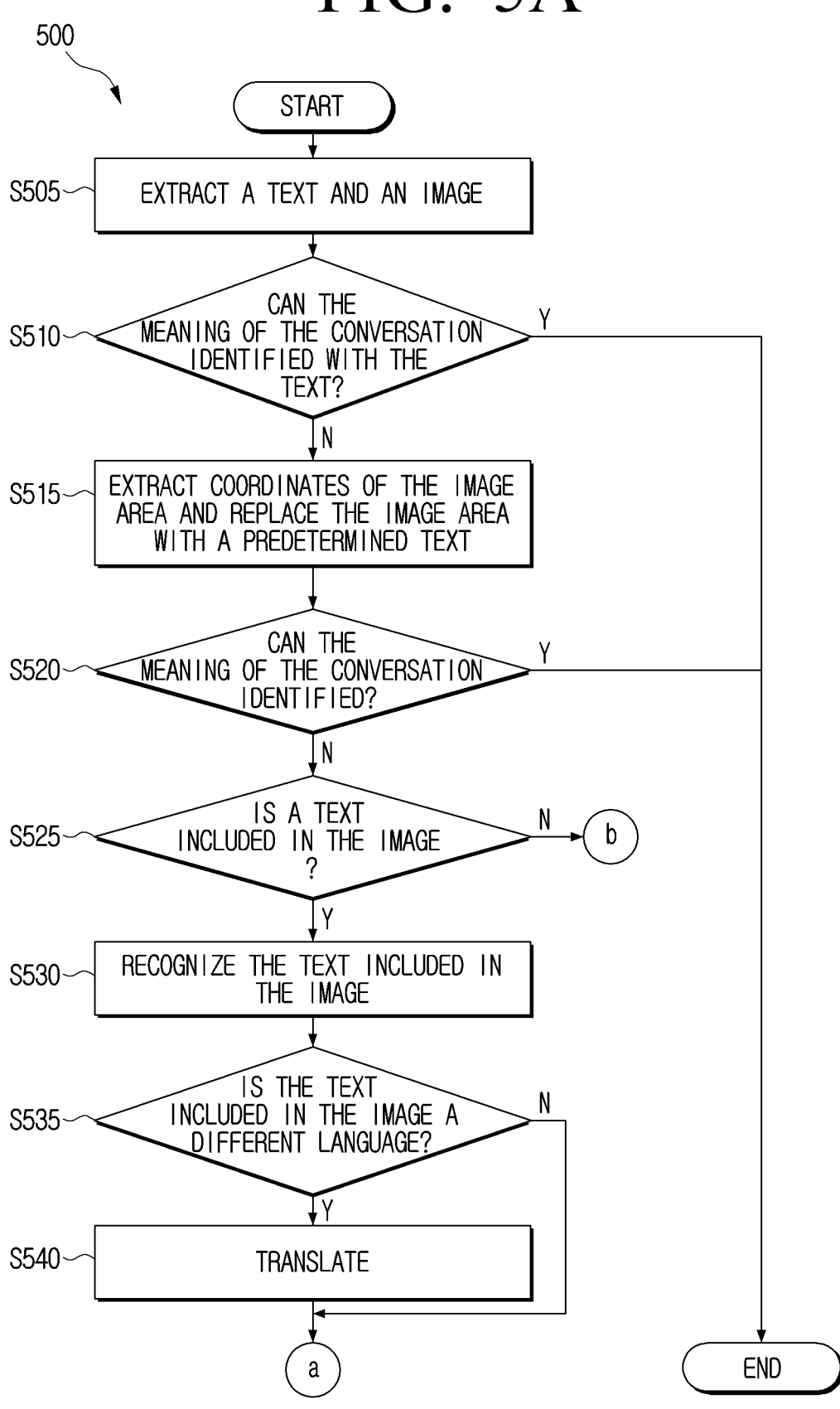
FIG. 5A and FIG. 5B are flow charts illustrating a process of identifying the meaning of a conversation according to an embodiment of the disclosure.
Figure 5B:
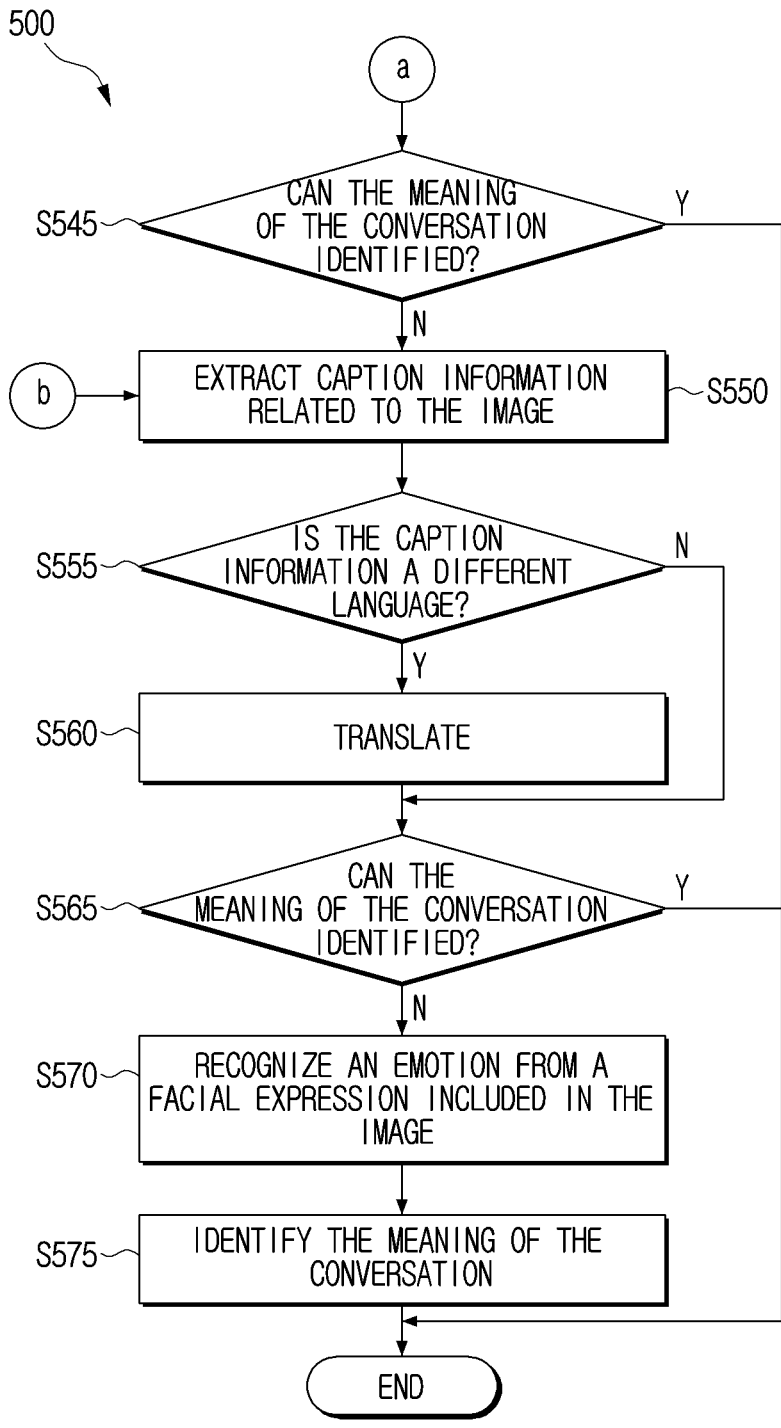

FIG. 5A and FIG. 5B are flow charts illustrating a process 500 of identifying the meaning of a conversation according to an embodiment of the disclosure. The process 500 will be described with reference to FIG. 5A and FIG. 5B together.

Referring to FIG. 5A, the electronic apparatus 100 may extract a text and an image from conversation data in operation S505. The electronic apparatus 100 may determine whether the meaning of the conversation can be identified only with the extracted text in operation S510. If the meaning of the conversation can be identified only with the extracted text (Y in operation S510), the electronic apparatus 100 may output the identified meaning of the conversation and the process 500 may terminate. Alternatively or additionally, the electronic apparatus 100 may store the identified meaning of the conversation.

If the meaning of the conversation cannot be identified only with the extracted text (N in operation S510), the process 500 may proceed to operation S515, in which the electronic apparatus 100 may extract coordinates of the image area, and replace the image area with a predetermined text. For example, the predetermined text may include a text of positive meaning, a text of negative meaning, or a text related to the content of the previously recognized query. The electronic apparatus 100 may determine whether the meaning of the conversation can be identified based on the replaced predetermined text in operation S520. If the meaning of the conversation can be identified based on the replaced predetermined text (Y in operation S520), the electronic apparatus 100 may output the identified meaning of the conversation and the process 500 may terminate. Alternatively or additionally, the electronic apparatus 100 may store the identified meaning of the conversation.

If the meaning of the conversation cannot be identified based on the replaced predetermined text (N in operation S520), the process 500 may proceed to operation S525 in which the electronic apparatus 100 may determine whether text is included in the image. If text is not included in the image ((b) in FIG. 5A), the process 500 may proceed to operation S550 in which the electronic apparatus 100 may extract caption information related to the image. If text is included in the image (Y in operation S525), the process 500 may continue to operation S530 in which the electronic apparatus 100 may recognize the text included in the image. For example, the electronic apparatus 100 may determine whether text is included in the image by using the OCR method. If text is recognized in the image, the electronic apparatus 100 may determine that text is included in the image.

The electronic apparatus 100 may determine whether the recognized text is a language different from the main language of the conversation data in operation S535. If the recognized text is a language different from the main language (Y in operation S535), the electronic apparatus 100 may translate the language of the recognized text into the main language in operation S540. Then, the electronic apparatus 100 may determine whether the meaning of the conversation can be identified in operation S545. Alternatively or additionally, if the recognized text is the same language as the main language (N in operation S535), the electronic apparatus 100 may determine whether the meaning of the conversation can be identified based on the recognized text in operation S545. If the meaning of the conversation can be identified based on the recognized text (Y in operation S545), the electronic apparatus 100 may output the identified meaning of the conversation and the process 500 may terminate. Alternatively or additionally, the electronic apparatus 100 may store the identified meaning of the conversation.

If the meaning of the conversation cannot be identified based on the recognized text (N in operation S545), the electronic apparatus 100 may extract caption information related to the image by using the image caption engine in operation S550. Alternatively or additionally, as described above, if text is not included in the image (ⓑ) in FIG. 5A), the electronic apparatus 100 may extract caption information related to the image in operation S550.

The electronic apparatus 100 may identify whether the extracted caption information is a language different from the main language of the conversation data in operation S555. If the extracted caption information is a language different from the main language (Y in operation S555), the electronic apparatus 100 may translate the language of the extracted caption information into the main language in operation S560. Then, the electronic apparatus 100 may determine whether the meaning of the conversation can be identified in operation S565. Alternatively or additionally, if the extracted caption information is the same language as the main language (N in operation S555), the electronic apparatus 100 may determine whether the meaning of the conversation can be identified based on the extracted caption information in operation S565. If the meaning of the conversation can be identified based on the extracted caption information (Y in operation S565), the electronic apparatus 100 may output the identified meaning of the conversation and the process 500 may terminate. Alternatively or additionally, the electronic apparatus 100 may store the identified meaning of the conversation.

If the meaning of the conversation cannot be identified based on the extracted caption information (N in operation S565), the electronic apparatus 100 may recognize an emotion from a facial expression included in the image in operation S570. The electronic apparatus 100 may determine a corresponding emotion group among emotion groups classified from the facial expression included in the image, and recognize an emotion. The electronic apparatus 100 may identify the meaning of the conversation based on the recognized emotion in operation S575, and output the identified meaning of the conversation. Alternatively or additionally, the electronic apparatus 100 may store the identified meaning of the conversation.

Figure 6:
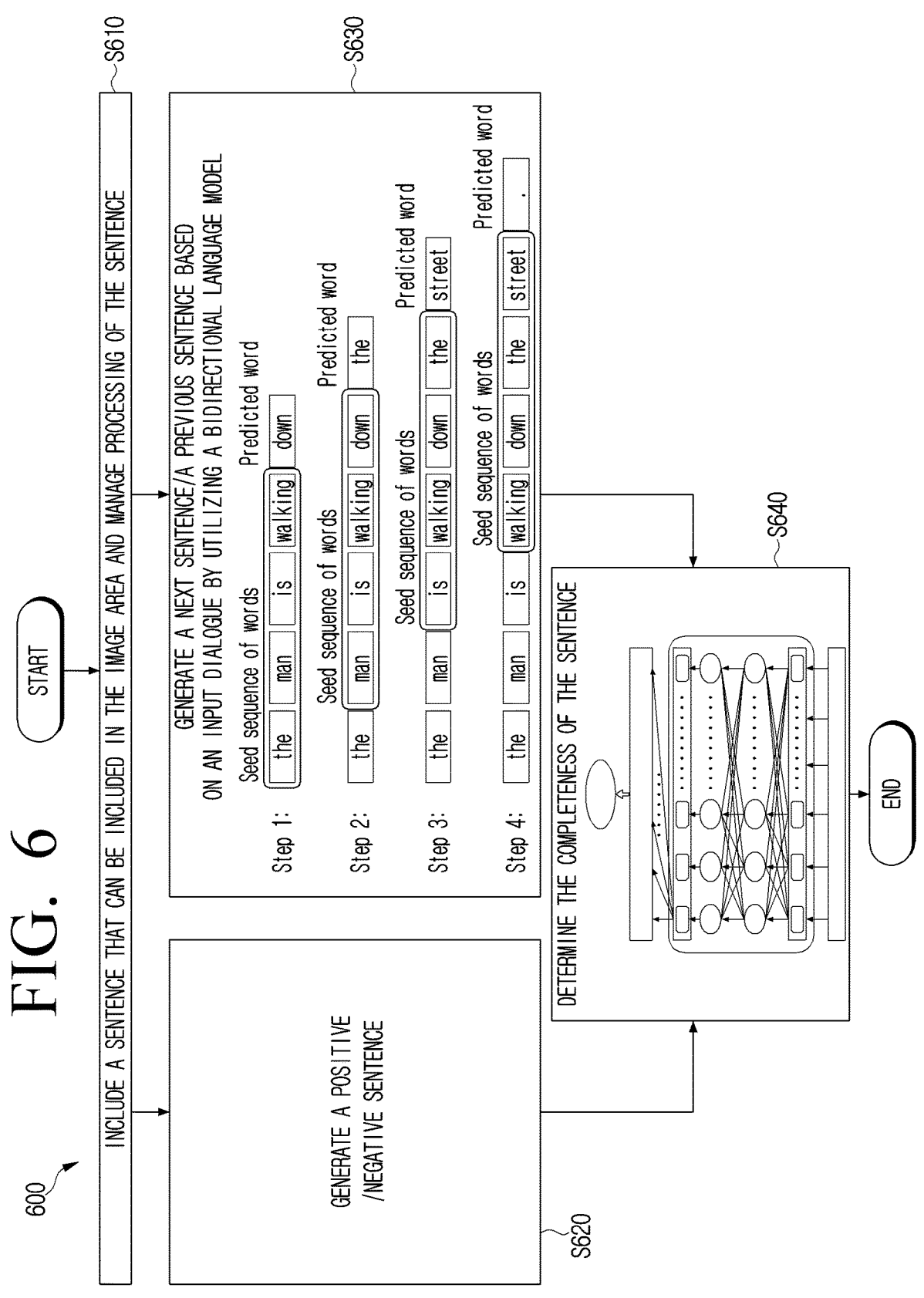
FIG. 6 is a diagram illustrating a process of determining importance of an image included in conversation data according to an embodiment of the disclosure.

FIG. 6 is a diagram illustrating a process of determining importance of an image included in conversation data according to an embodiment of the disclosure.

Referring to FIG. 6, a process 600 of determining completeness of a text is illustrated. Completeness of a text may refer to identifying the meaning of a conversation based on acquired information, and determining whether it is possible to figure out the context, for example. For example, if conversation data includes a text, and a query and a response exists in the text and the meaning of the conversation can be identified, the electronic apparatus 100 may determine that the text is complete, and determine that the importance of the image included in the conversation data is low.

Alternatively or additionally, the electronic apparatus 100 may replace the image area with a predetermined text and determine the completeness of the text in operation S610. As illustrated in FIG. 6, the electronic apparatus 100 may generate a positive/negative sentence (text) in operation S620, and insert the generated positive/negative sentence in the image area. Alternatively or additionally, the electronic apparatus 100 may generate a related text based on the previous conversation data in operation S630, and insert the generated related text in the image area. The electronic apparatus 100 may insert the predetermined text in the image area and determine the completeness of the sentence in operation S640. For example, the electronic apparatus 100 may generate a related text that may be arranged before or after the sentence based on the input conversation data by using a language model, as shown in Steps 1-4 of operation S630. As an example, the language model may include a bidirectional language model. In some embodiments, the electronic apparatus 100 may use an artificial intelligence neural network model corresponding to each function for generating a related text and determining the completeness of the text.

For example, functions related to artificial intelligence according to the disclosure are operated through a processor and a memory. The processor may consist of one or a plurality of processors. Here, the one or plurality of processors may be generic-purpose processors such as a central processing unit (CPU), an application processor (AP), a digital signal processor (DSP), graphic-dedicated processors such as a graphics processing unit (GPU), a vision processing unit (VPU), or artificial intelligence-dedicated processors such as a neural processing unit (NPU). The one or plurality of processors perform control to process input data according to predefined operation rules or an artificial intelligence model stored in the memory. Alternatively or additionally, in case the one or plurality of processors are artificial intelligence-dedicated processors, the artificial intelligence-dedicated processors may be designed as a hardware structure specified for processing of a specific artificial intelligence model.

The predefined operation rules or the artificial intelligence model are characterized in that they are made through learning. Here, being made through learning may refer to a basic artificial intelligence model being trained by using a plurality of learning data by a learning algorithm, and predefined operations rules or an artificial intelligence model set to perform desired characteristics (or, purposes) are thereby made. Such learning may be performed in a device itself wherein artificial intelligence is performed according to the disclosure, or through a separate server/system. As examples of learning algorithms, there are supervised learning, unsupervised learning, semi-supervised learning, or reinforcement learning, but learning algorithms in the disclosure are not limited to the aforementioned examples.

An artificial intelligence model may consist of a plurality of neural network layers. Each of the plurality of neural network layers has a plurality of weight values, and performs a neural network operation through an operation between the operation result of the previous layer and the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized. An artificial neural network may include a deep neural network (DNN), and there are, for example, a convolutional neural network (CNN), a deep neural network (DNN), a recurrent neural network (RNN), a restricted Boltzmann Machine (RBM), a deep belief network (DBN), a bidirectional recurrent deep neural network (BRDNN), or deep Q-networks, but the disclosure is not limited to the aforementioned examples.

If the meaning of a conversation is identified based on a replaced text, the electronic apparatus 100 may determine that the text is complete, and determine that the importance of an image included in the conversation data is low.

Alternatively or additionally, the electronic apparatus 100 may acquire a text included in the image, caption information related to the image, emotion information related to a facial expression included in the image. Then, the electronic apparatus 100 may determine the completeness of the text based on the acquired information. That is, the electronic apparatus 100 may identify the meaning of the conversation. In this case, as the electronic apparatus 100 acquired information from the image and determined the completeness of the text (and/or the meaning of the conversation), the electronic apparatus 100 may determine that the importance of the image included in the conversation data is high. In some embodiments, when recognizing a facial expression included in the image or acquiring emotion information related to the facial expression, the electronic apparatus 100 may use an artificial intelligence neural network model corresponding to each function.

The controlling method of an electronic apparatus 100 according to the aforementioned various embodiments may also be provided as a computer program product. A computer program product may include an software (S/W) program itself, or a non-transitory computer readable medium having an S/W program stored therein.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a compact discs (CD), a digital video disc (DVD), a hard disk, a Blu-ray (BD) disk, a USB, a memory card, a ROM, and the like.

While example embodiments of the disclosure have been shown and described, the disclosure is not limited to the aforementioned specific embodiments, and it is apparent that various modifications may be made by those having ordinary skill in the technical field to which the disclosure belongs, without departing from the spirit and scope of the disclosure as claimed by the appended claims and their equivalents. Further, it is intended that such modifications are not to be interpreted independently from the technical idea or prospect of the disclosure.

What is claimed is:

1. An electronic apparatus, comprising:
a transceiver;
an output interface; and
a processor communicatively coupled to the transceiver and the output interface,
wherein the processor is configured to:
control the transceiver to receive conversation data comprising one or more texts and one or more images;
extract a first text and an image from the one or more texts and the one or more images of the conversation data, the image comprising an uniform record locator (URL);
connect to a web server to acquire main information and a screen of the URL;
identify a meaning of the conversation data based on at least one of the first text, the image, and the main information of the URL; and
control the output interface to output the meaning of the conversation data and the screen of the URL,
wherein to identify the meaning of the conversation data comprises to:
perform a first attempt to identify the meaning of the conversation data based on the first text excluding the image;
determine, by an artificial intelligence neural network model and using a language model, an importance of the image based on the meaning of the conversation data;
based on at least one of the meaning of the conversation data not being identified by the first attempt or the importance of the image exceeding a predetermined threshold:
extract coordinates for an area of the image;
replace the area of the image with a predetermined second text based on the coordinates, the predetermined second text being determined, by the artificial intelligence neural network model, using the language model and based on a previous text of the conversation data; and
perform a second attempt to identify the meaning of the conversation data based on the first text and the predetermined second text;
based on the meaning of the conversation data not being identified by the first attempt and the second attempt:
recognize a third text included in the image by using an optical character recognition (OCR) method; and
perform a third attempt to identify the meaning of the conversation data based on the first text and the third text.

2. The electronic apparatus of claim 1, wherein the processor is further configured to:
identify the meaning of the conversation data based on the first text and the image.

3. The electronic apparatus of claim 1,
wherein the predetermined second text comprises at least one of a positive response text, a negative response text, and a text related to the first text.

4. The electronic apparatus of claim 1, wherein the processor is further configured to:
based on the first text being a first language and the third text being a second language different from the first language, translate the third text into the first language.

5. The electronic apparatus of claim 1, wherein the processor is further configured to:

based on the meaning of the conversation data not being identified by the first attempt, the second attempt, and the third attempt:

extract caption information from the image; and perform a fourth attempt to identify the meaning of the conversation data based on the first text and the caption information.

6. The electronic apparatus of claim 5, wherein the processor is further configured to:

based on the meaning of the conversation data not being identified by the first attempt, the second attempt, the third attempt, and the fourth attempt:

recognize a facial expression included in the image;

identify an emotion corresponding to the facial expression; and identify the meaning of the conversation data based on the first text and the emotion.

7. The electronic apparatus of claim 1, wherein to control the output interface to output the meaning of the conversation data comprises to:

control the output interface to output the meaning of the conversation data as an output image.

8. The electronic apparatus of claim 1, wherein the image includes at least one of an emoticon, a thumbnail image, and a meme.

9. A controlling method of an electronic apparatus, the controlling method comprising:

receiving, by a transceiver of the electronic apparatus, conversation data comprising one or more texts and one or more images;

extracting a first text and an image from the one or more texts and the one or more images of the conversation data, the image comprising an uniform record locator (URL);

connecting to a web server and acquiring main information and a screen of the URL;

identifying a meaning of the conversation data based on at least one of the first text, the image, and the main information of the URL; and outputting, to an output interface of the electronic apparatus, the meaning of the conversation data and the screen of the URL, wherein the identifying of the meaning of the conversation data comprises:

performing a first attempt to identify the meaning of the conversation data based on the first text excluding the image;

determining, by an artificial intelligence neural network model and using a language model, an importance of the image based on the meaning of the conversation data;

based on at least one of the meaning of the conversation data not being identified by the first attempt or the importance of the image exceeding a predetermined threshold:

extracting coordinates for an area of the image;

replacing the area of the image with a predetermined second text based on the coordinates, the predetermined second text being determined, by the artificial intelligence neural network model, using the language model and based on a previous text of the conversation data; and performing a second attempt to identify the meaning of the conversation data based on the first text and the predetermined second text;

based on the meaning of the conversation data not being identified by the first attempt and the second attempt:

recognizing a third text included in the image by using an optical character recognition (OCR) method; and performing a third attempt to identify the meaning of the conversation data based on the first text and the third text.

10. The controlling method of claim 9, wherein the identifying of the meaning of the conversation data comprises:

identifying the meaning of the conversation data based on the first text and the image.

11. The controlling method of an electronic apparatus of claim 9, wherein the predetermined second text comprises at least one of a positive response text, a negative response text, and a text related to the first text.

12. The controlling method of claim 9, wherein the identifying of the meaning of the conversation data further comprises:

based on the meaning of the conversation data not being identified by the first attempt, the second attempt, and the third attempt:

extracting caption information from the image; and performing a fourth attempt to identify the meaning of the conversation data based on the first text and the caption information.

13. The controlling method of claim 12, wherein the identifying of the meaning of the conversation data further comprises:

based on the meaning of the conversation data not being identified by the first attempt, the second attempt, the third attempt, and the fourth attempt:

recognizing a facial expression included in the image;

identifying an emotion corresponding to the facial expression; and identifying the meaning of the conversation data based on the first text and the emotion.

* * * * *